(12) United States Patent
Corley

(10) Patent No.: US 8,467,060 B2
(45) Date of Patent: Jun. 18, 2013

(54) COLOUR IMAGE REFERENCE SYSTEM FOR MONITOR AND PROJECTOR IMAGES

(76) Inventor: Ferrand D. E. Corley, Mississauga (CA)

( * ) Notice: Subject to any disclaimer, the term of this patent is extended or adjusted under 35 U.S.C. 154(b) by 535 days.

(21) Appl. No.: 12/659,865

(22) Filed: Mar. 24, 2010

(65) Prior Publication Data

US 2010/0253946 A1 Oct. 7, 2010

(51) Int. Cl.
*G01J 3/52* (2006.01)
*G01N 21/25* (2006.01)
*H04N 17/02* (2006.01)

(52) U.S. Cl.
USPC ........... 356/421; 356/419; 356/423; 348/188; 348/180

(58) Field of Classification Search
USPC .................. 356/419–423; 348/180, 188, 187, 348/375, 189; 345/204
See application file for complete search history.

(56) References Cited

U.S. PATENT DOCUMENTS

| | | | | |
|---|---|---|---|---|
| 4,718,768 | A * | 1/1988 | Houki et al. | 356/402 |
| 6,067,166 | A * | 5/2000 | Fox et al. | 356/402 |
| 6,912,017 | B1 * | 6/2005 | Minami et al. | 348/743 |
| 7,057,641 | B2 * | 6/2006 | Bodnar et al. | 348/188 |
| 8,106,894 | B2 * | 1/2012 | Lin | 345/204 |

* cited by examiner

*Primary Examiner* — Layla Lauchman

(57) ABSTRACT

A test apparatus comprising a self illuminated light source and second moveable element having spectrophotometrically neutral gray and color patches of predetermined hues and saturations. A digital software file provides identical spectrophotometrically neutral grayscale and color data which, when reproduced on a monitor or projection system, should match the grayscale and test colors provided by the apparatus. When the apparatus is placed in front of the monitor image or projected image, the neutral grays and color patches reproduced on the monitor image or projected image are compared against the image of the apparatus.

Figure 1:
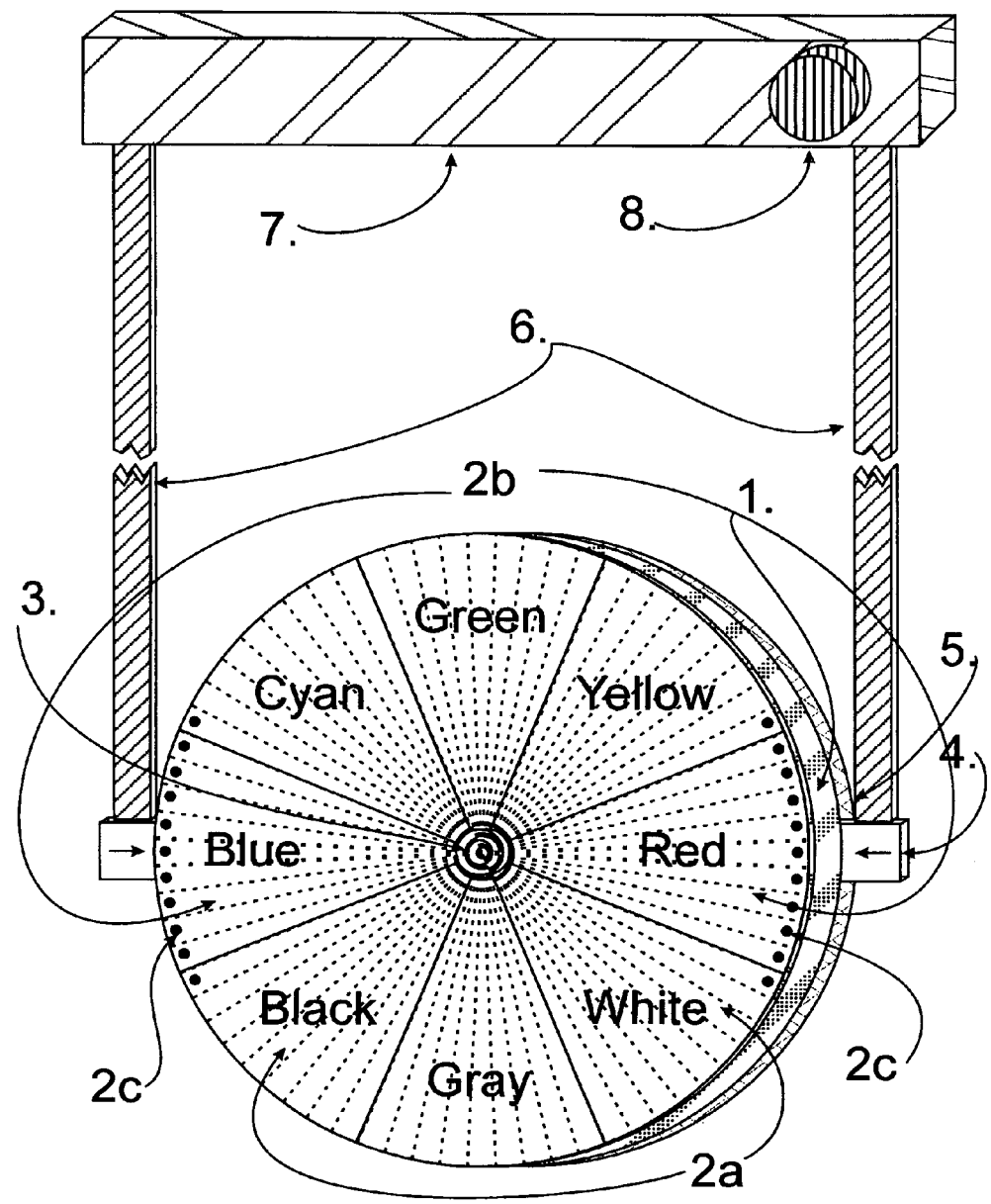

3 Claims, 6 Drawing Sheets ered. In the field of the invention

COLOUR IMAGE REFERENCE SYSTEM FOR MONITOR AND PROJECTOR IMAGES

FIELD OF THE INVENTION

The invention relates to an apparatus for evaluating the neutrality and quantifying the accuracy of colour reproduction in colour monitors and projection systems, and to a method of evaluating such reproductions.

BACKGROUND OF THE INVENTION

Accuracy of colour reproduction is important in many fields and vital in medical diagnosis and law enforcement. It is highly desirable that anyone with minimal technical skills and normal colour vision is able to evaluate the accuracy of image reproduction in colour monitors and projection systems and to provide data enabling correction of said image reproduction.

Images are invariably viewed in one of three ways; as a front illuminated print, such as a book or magazine, a rear illuminated device such as a television set or computer monitor, or as a film or digitally projected image such as a slide or motion picture. The present invention relates to the latter two systems.

Typical image evaluation systems designed to address accuracy of colour reproduction electronically, sense the brightness, hue and saturation of the images displayed on a colour monitor or projected on a screen. The resulting data is typically provided in CIE values.

Such systems rely on the accuracy and consistency of the sensors and associated electronic equipment, which can require frequent recalibration. Evaluating the data from such systems is not intuitive and requires considerable experience to interpret the results.

BRIEF SUMMARY OF THE INVENTION

This invention is designed to overcome these limitations and provides an apparatus for use in evaluating the accuracy of reproduction in images displayed on monitors and projection screens, wherein a light source having adjustable brightness and colour characteristics, shines light through a second element comprising a pattern having a multiplicity of grayscale and colour wedges.

The light source and the element may be disk shaped or rectangular.

The image may be a display on a monitor, or may be an image projected onto a screen.

In one embodiment a digital file provides an identical pattern which is displayed on a colour monitor or projection screen. The grayscale and colours from the digital file displayed on the monitor or projection screen are compared with those on the apparatus. The image from a monitor or projection system that is accurately reproducing the digital file should visually match the image on the apparatus. Errors in reproduction of the displayed digital image can be quantified by moving the grayscale and colour element and noting deviations from ideal. In this embodiment the grayscale and colour elements being wedge shaped eliminate any difference in image size between the colour and grayscale elements on the apparatus and the image displayed on the monitor.

The illuminated light source may be in the form of a disk and may be used without the standard grayscale and colour element as a reference to adjust the brightness and basic colour temperature of the display system.

Advantageously the standard element can also be in the form of a disk, and be rotatable relative to the illuminated light source.

For a better understanding of the invention, its operating advantages and specific objectives attained by its use, reference should be made to the accompanying drawings and descriptive matter in which there are illustrated and described preferred embodiments of the invention.

IN THE DRAWINGS

Figure 2:
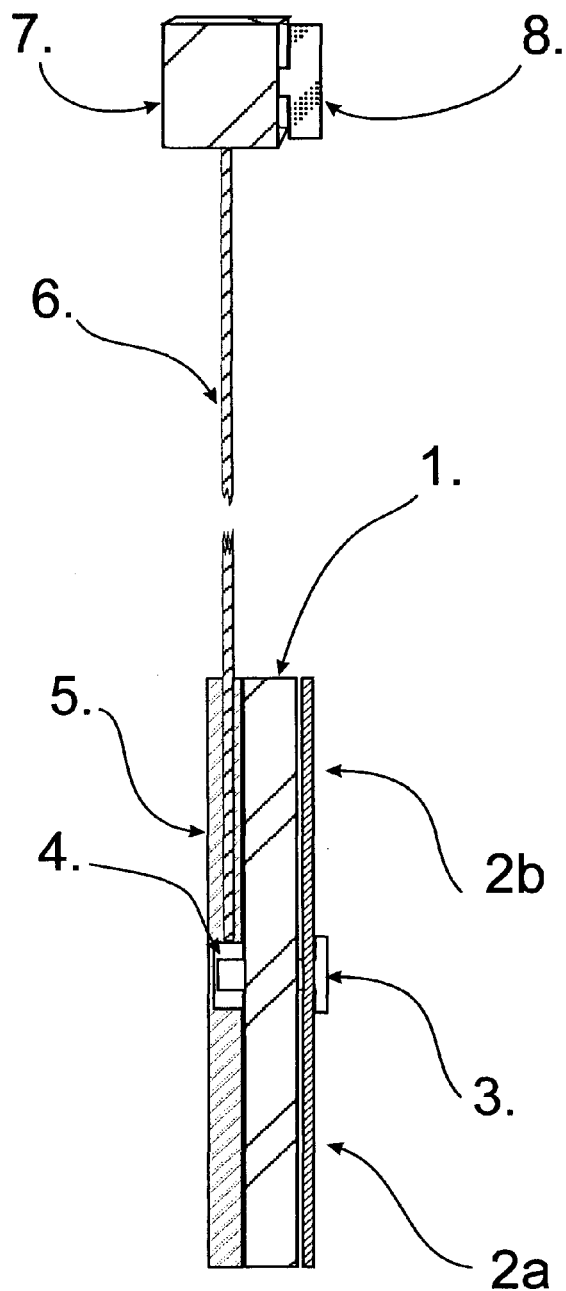
Figure 7:
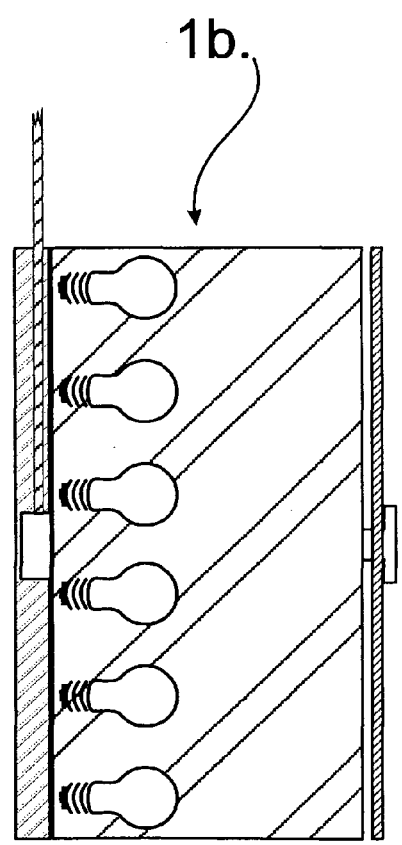
Figure 3:
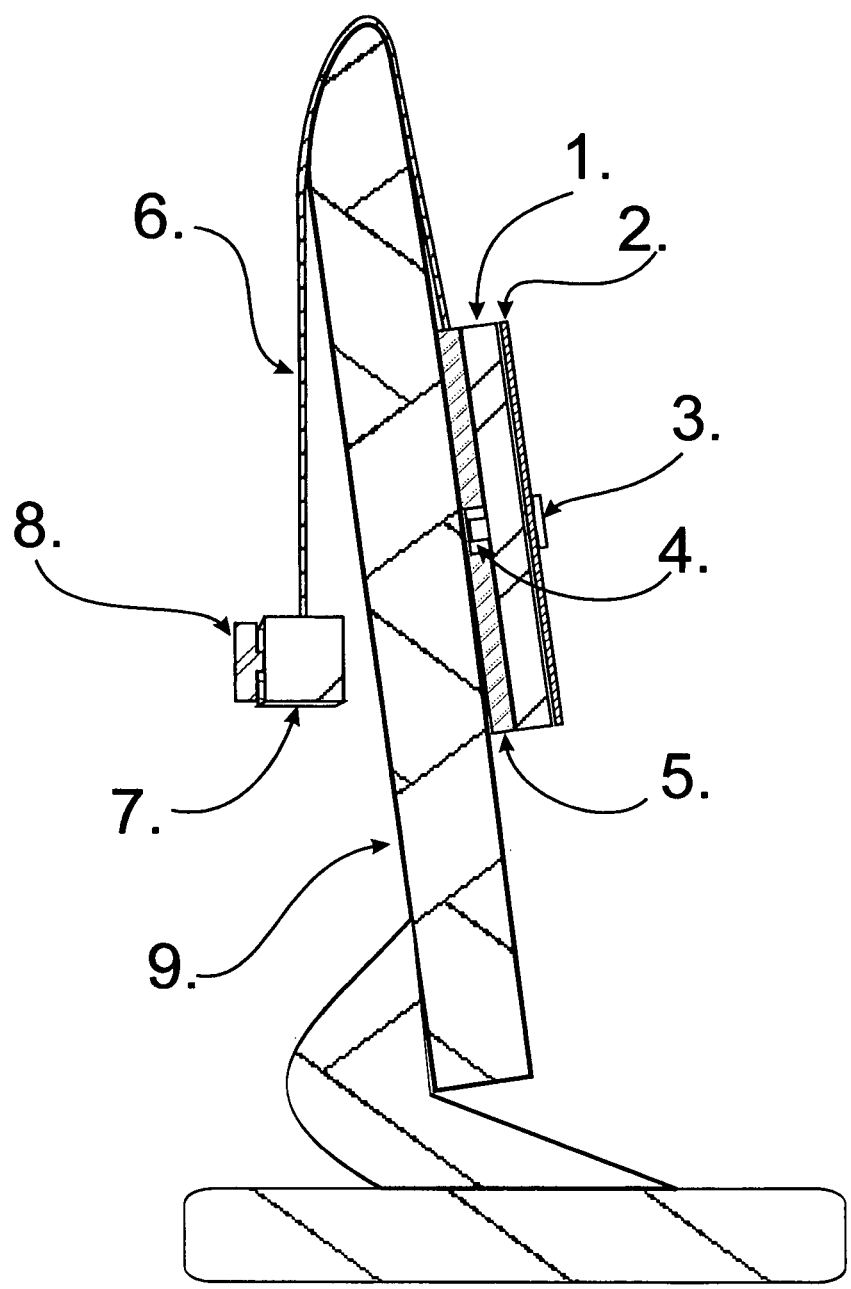
Figure 4:
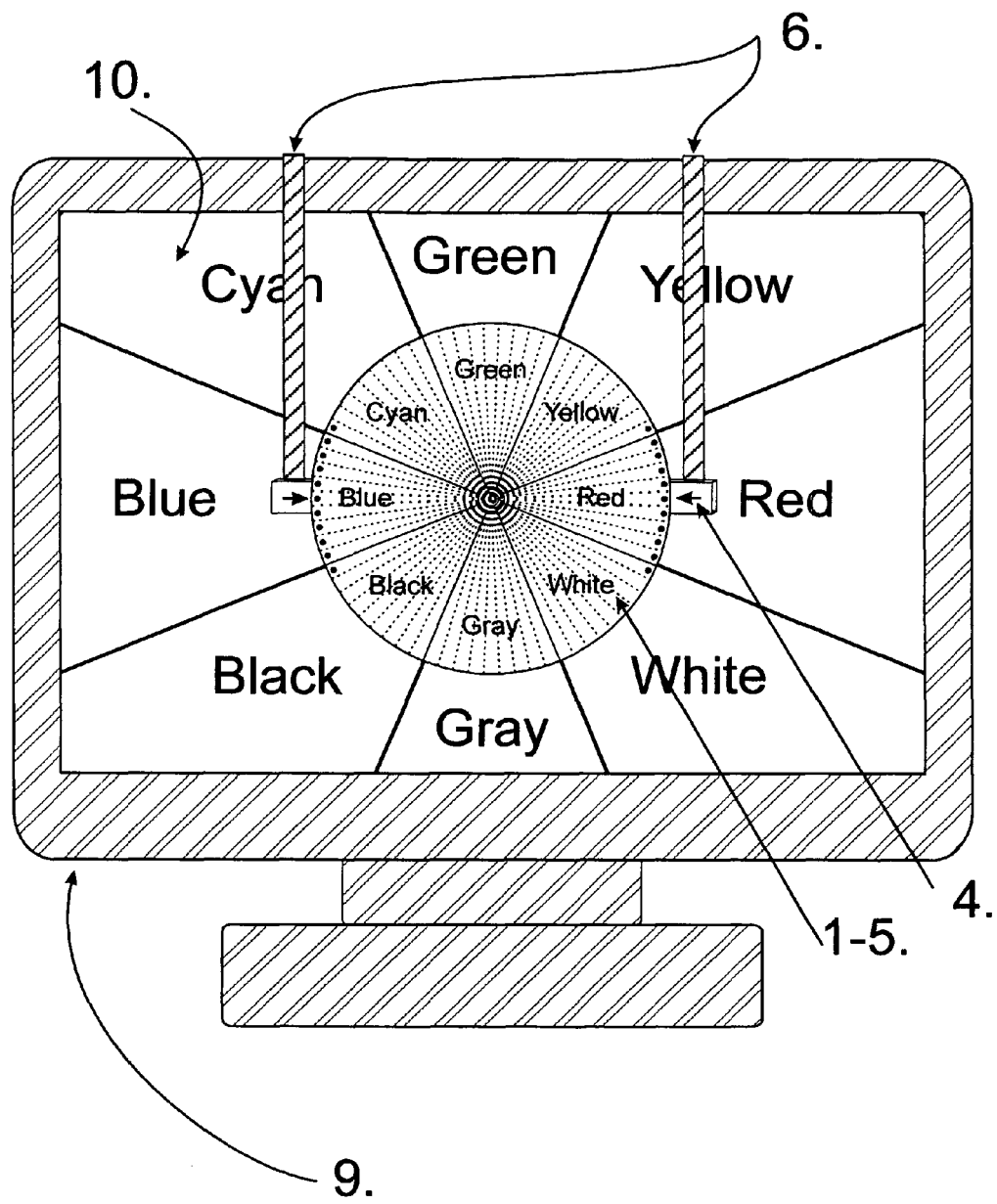
Figure 5:
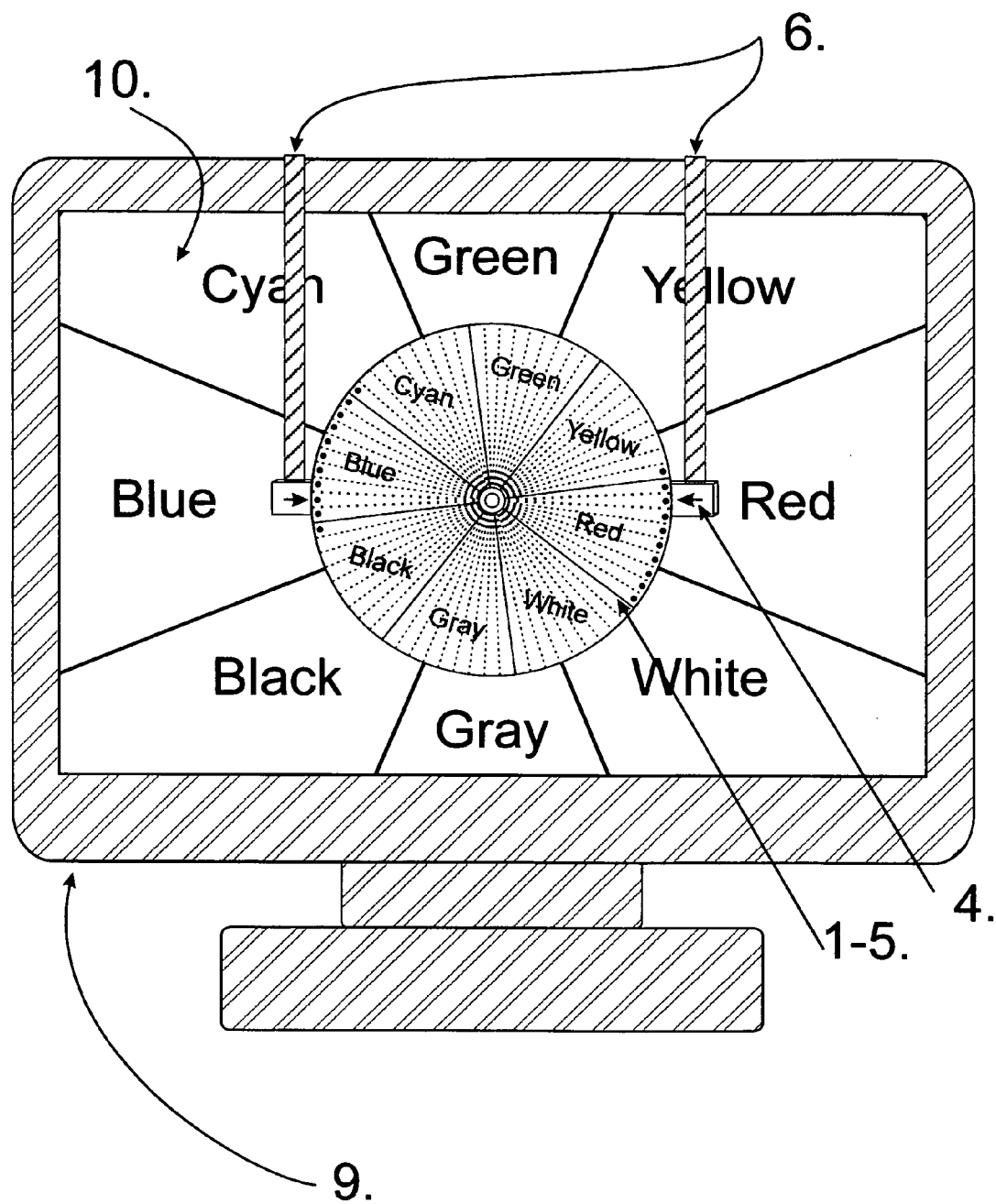
Figure 6:
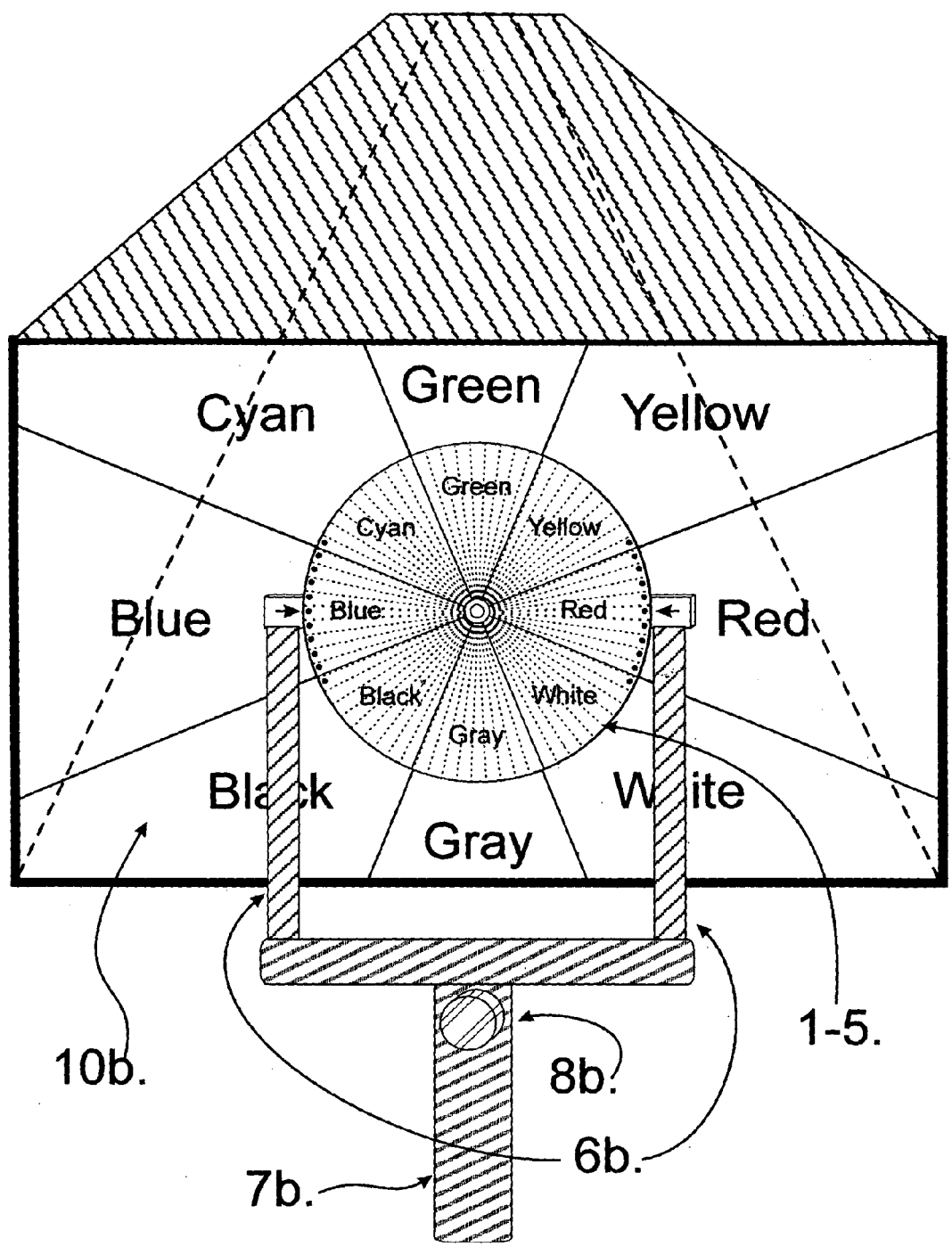

FIG. 1—Front view of one embodiment of the apparatus;
FIG. 2—is a side view of the apparatus;
FIG. 3—is a side view of the apparatus as used with a monitor;
FIG. 4—is a front view of apparatus as used with a monitor;
FIG. 5—is a front view of a monitor showing the element rotated;
FIG. 6—is a frontview of the apparatus as used in projection systems; and,
FIG. 7 is a section of an alternate form of light source showing lamps in a housing.

DESCRIPTION OF A PREFERRED EMBODIMENT FOR REAR ILLUMINATED IMAGES

Referring to FIGS. 1-5, an electro luminescent, or other light source 1 of a predetermined, known spectral distribution, illuminates element disk 2. Disk 2 comprises a multiplicity of spectrophotometrically neutral gray tones from transparent to virtually opaque 2a, along with a multiplicity of colours 2b covering the human visible spectrum, increasing from approximately 400 to 700 nm.

While a few large segments are illustrated, for simplicity, it will be understood that there would usually be a much larger number of smaller segments (indicated by phantom radial lines).

The light source 1 may be a flat panel, or may be a box like housing 1b (FIG. 7) containing a plurality of bulbs or other sources of light. This will expand the number of different light sources that can be used and make the illumination more even. The light source will be adjustable as to brightness, and as to colour spectrum, to adapt to viewing images from a variety of sources.

The disk 2 is capable of being back illuminated. Typically it will be translucent, or transparent in some cases.

Disk 2 also contains calibration markings 2c which are used to measure rotational angle of the disk. Disk 2 is attached to, but removable from the light source 1 by a popper 3 or other quick release device.

Light source 1 and disk 2 are rotatably attached to a mounting member 4.

Anti scratch material 5 is attached to light source 1 and mounting member 4. Flexible straps 6, capable of carrying electric current, are connected to the light source 1 through mounting member 4 at one end and to a battery pack or power source 7 at the other. Switch 8 is used to turn on and off the illuminated light source 1.

Disk 2 can be made up in a variety of different patterns, with different spectral characteristics, to suit various different applications.

In use with a monitor, the disk assembly of FIGS. 1-5 is positioned in front of a monitor 9 with the battery pack 7 at the rear of the monitor counterbalancing the disk assembly. A digital software file generates an identical pattern 10 on the monitor 9 adjusted to the same colour temperature to that provided on the disk, typically D 65.

Flexible straps 6 enable disk assembly of FIGS. 1-5 to be hung over the monitor and positionally aligned with the image generated by software file 10. Anti scratch material 5 prevents disk assembly of FIGS. 1-5 from scratching the front of monitor 9.

On a monitor that is reproducing colour accurately there should be no discernible difference between the image generated by the monitor from software file 10 and the image on the disk assembly 1-5. Where there are differences, these may be quantified by rotating disk 2 until the tones/colours match and then measuring the deviation using scale 2c.

If desired appropriate corrections can then ne made to the monitor to correct the image colours being displayed.

Description of a Preferred Embodiment for Front Projected Images.

Referring to FIG. 6 it will be noted that the only difference between using the device for rear illuminated and a front projected image 10b is that items 1-5 are now connected through a mounting support 6b to a battery pack 7b containing the on/off switch 8b.

When used with front projected images, as in a motion picture theater, the projected image is typically above the apparatus. The amount of error in the reproduction of the grayscale and colours reproduced by the colour reproduction system can be calculated by moving the element disk until the gray tones or colours match the colours or grayscales of the image.

Any deviation can then be assessed. Appropriate corrections can then be made in the projector, to correct the image displayed.

The invention can be used in two ways, to improve the accuracy of a colour reproduction system, using such controls as exist in the system's control circuits, as are well established and known by those in the business, or to compare the reproduction accuracy of one colour reproduction system against another.

The foregoing is a description of a preferred embodiment of the invention which is given here by way of example only. The invention is not to be taken as limited to any of the specific features as described, but comprehends all such variations thereof as come within the appended claims.

What is claimed is:

1. An apparatus for use in evaluating the accuracy of reproduction of a test image displayed on a screen, and comprising;
   a housing supporting a light source, having a predetermined brightness and colour characteristics;
   a reference element supported by said housing comprising a pattern having a multiplicity of grayscale and colour wedges, said light source providing illumination for said element to provide an illuminated reference image,
   a movable mounting attached to said housing and supporting the reference element and the light source in registration with said screen and test image, whereby said reference image may be supported overlaid over said test image on said screen; and,
   a rotatable connection attached to said housing and connected to said reference element permitting rotation of the reference element relative to said test image on said screen.

2. An apparatus for use in evaluating the accuracy of reproduction in images as claimed in claim 1 wherein said screen is a digital monitor and including a digital file adapted to provide said test image displayed on said monitor for comparison with said reference element.

3. An apparatus for use in evaluating the accuracy of reproduction in images as claimed in claim 1, wherein said light source is a disk, and wherein said reference element is a disk, and including a rotatable device mounting said reference element in registration with said light source.

* * * * *